(12) United States Patent  
Ibtehaz et al.

(10) Patent No.: US 12,153,759 B2  
(45) Date of Patent: Nov. 26, 2024

(54) WEARABLE DEVICE AND CONTROL METHOD THEREFOR

(71) Applicant: SAMSUNG ELECTRONICS CO., LTD., Suwon-si (KR)

(72) Inventors: Nabil Ibtehaz, Dacca (BD); Md. Rakibul Islam, Dacca (BD); Shaon Kanti Dhar, Dacca (BD)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/125,539

(22) Filed: Mar. 23, 2023

(65) Prior Publication Data

US 2023/0229260 A1 Jul. 20, 2023

Related U.S. Application Data

(63) Continuation of application No. PCT/KR2021/010668, filed on Aug. 11, 2021.

(30) Foreign Application Priority Data

Sep. 23, 2020 (KR) .................. 10-2020-0123255

(51) Int. Cl.
 *G06F 3/041* (2006.01)
(52) U.S. Cl.
 CPC .......... *G06F 3/0418* (2013.01); *G06F 3/0414* (2013.01)
(58) Field of Classification Search
 CPC .................. G06F 3/0418; G06F 3/0414
 See application file for complete search history.

(56) References Cited

U.S. PATENT DOCUMENTS

| | | | |
|---|---|---|---|
| 10,078,365 | B2 | 9/2018 | Kim et al. |
| 10,152,153 | B2 | 12/2018 | Jung et al. |
| 10,291,975 | B2 | 5/2019 | Howell et al. |
| 2013/0265257 | A1 | 10/2013 | Jung et al. |
| 2016/0070338 | A1 | 3/2016 | Kim et al. |
| 2019/0132441 | A1 | 5/2019 | Li |
| 2020/0026352 | A1* | 1/2020 | Wang ............... G06F 3/044 |

(Continued)

FOREIGN PATENT DOCUMENTS

| | | |
|---|---|---|
| CN | 109361985 A | 2/2019 |
| CN | 110381407 A | 10/2019 |
| CN | 110505550 A | 11/2019 |

(Continued)

OTHER PUBLICATIONS

International Search Report (PCT/ISA/210) issued Nov. 18, 2021 by the International Searching Authority in International Patent Application No. PCT/KR2021/010668.

(Continued)

*Primary Examiner* — Robert J Michaud  
(74) *Attorney, Agent, or Firm* — Sughrue Mion, PLLC

(57) ABSTRACT

A wearable device includes a plurality of sensors including a touch sensor; and a processor configured to: acquire a touch input using the touch sensor; while the touch input is acquired, acquire a sensing value from at least one sensor other than the touch sensor among the plurality of sensors; determine, based on the sensing value, whether the touch input is an erroneous touch; and based on a result of the determination, perform an operation corresponding to the touch input.

17 Claims, 14 Drawing Sheets

(56) References Cited

U.S. PATENT DOCUMENTS

2020/0100010 A1    3/2020  Yang et al.

FOREIGN PATENT DOCUMENTS

| | | |
|---|---|---|
| CN | 111556396 A | 8/2020 |
| CN | 111954110 A | 11/2020 |
| KR | 10-1943435 B1 | 4/2019 |
| KR | 10-2037932 B1 | 10/2019 |
| KR | 10-2139912 B1 | 7/2020 |
| KR | 10-2020-0092456 A | 8/2020 |
| KR | 102163143 B1 * | 8/2020 |

OTHER PUBLICATIONS

Written Opinion (PCT/ISA/237) issued Nov. 18, 2021 by the International Searching Authority in International Patent Application No. PCT/KR2021/010668.

* cited by examiner

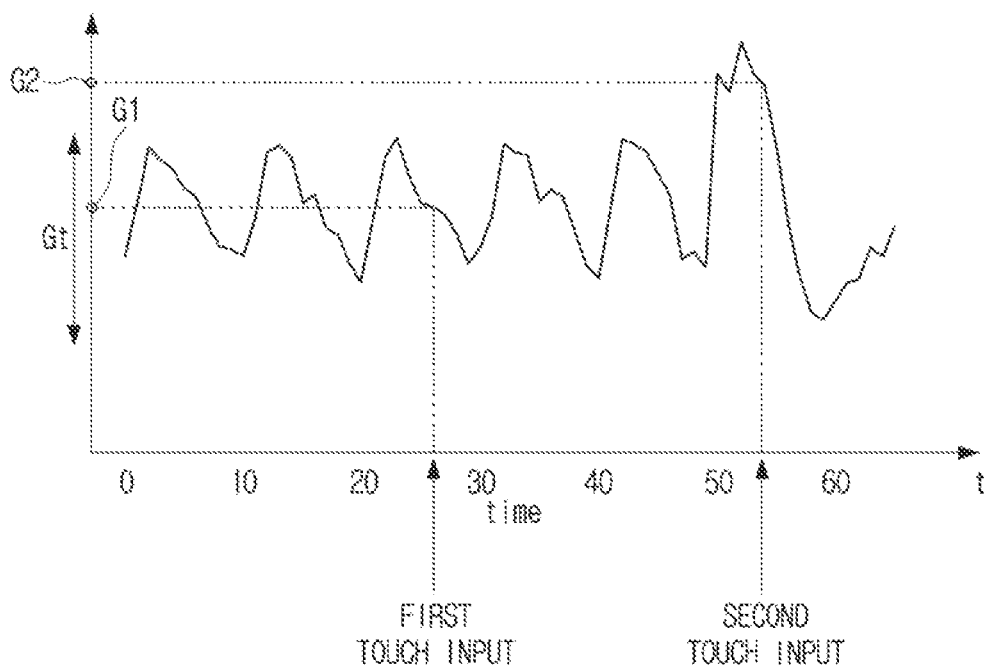

WEARABLE DEVICE AND CONTROL METHOD THEREFOR

CROSS-REFERENCE TO RELATED APPLICATIONS

This application is a by-pass continuation application of International Application No. PCT/KR2021/010668, filed on Aug. 11, 2021, which is based on and claims priority to Korean Patent Application No. 10-2020-0123255, filed on Sep. 23, 2020, in the Korean Intellectual Property Office, the disclosures of which are incorporated by reference herein in their entireties.

BACKGROUND

1. Field

The disclosure relates to a wearable device and a control method therefor, and more particularly, to a wearable device for determining whether or not a user's touch input to the wearable device is an erroneous touch, and a control method therefor.

2. Description of Related Art

With the development of electronic technology, the use of wearable devices such as wireless earphones and smart watches is increasing. Recently, wireless earphones that perform a playing function, a pausing function, or the like based on a user's touch input have been used.

The above information is provided as background information only to assist with an understanding of the disclosure. No determination or claim is made as to whether any of the above information might be applicable as prior art in connection with the disclosure.

A user may touch a wearable device not for operating the wearable device but for simply adjusting a position of the wearable device. As an example, a user may touch an earphone with a hand in order to fit the earphone to a user's ear, because every person has a different shape or size of ear. As another example, when an earphone has moved in an active situation, such as a situation where a user is exercising while wearing the earphone on a user's ear, the user may touch the earphone with a hand to adjust a position of the earphone. When a user's unintentional touch is acquired as described above, if the wearable device performs a function corresponding to the user's touch, the user may be inconvenienced.

Therefore, there has been a need for a wearable device capable of determining whether or not a user's touch input is an erroneous touch and performing an operation based on a determination result.

SUMMARY

Provided is a wearable device that may be capable of determining whether or not a user's touch input is an erroneous touch.

Additional aspects will be set forth in part in the description which follows and, in part, will be apparent from the description, or may be learned by practice of the presented embodiments.

According to aspect of the disclosure, a wearable device includes: a plurality of sensors including a touch sensor; and a processor configured to: acquire a touch input using the touch sensor; while the touch input is acquired, acquire a sensing value from at least one sensor other than the touch sensor among the plurality of sensors; determine, based on the sensing value, whether the touch input is an erroneous touch; and based on a result of the determination, perform an operation corresponding to the touch input.

The plurality of sensors may include a proximity sensor, and the processor may be further configured to: acquire a distance from the wearable device to a user using the proximity sensor; based on the distance being within a preset distance range, determine that the touch input is not the erroneous touch; and based on the distance being outside of the preset distance range, determine that the touch input is the erroneous touch.

The plurality of sensors may include a proximity sensor, and the processor may be further configured to: acquire, by using the proximity sensor, distance information from the wearable device to a user; and determine whether or not the touch input is the erroneous touch by inputting the distance information to a trained neural network model.

The plurality of sensors may include a motion sensor, and the processor may be further configured to: acquire, by using the motion sensor, motion information of the wearable device; and determine whether or not the touch input is the erroneous touch by inputting the motion information to a trained neural network model.

The plurality of sensors may include a pressure sensor, and the processor may be further configured to: acquire a pressure corresponding to the touch input using the pressure sensor; based on the acquired pressure being smaller than a threshold value, determine that the touch input is the erroneous touch; and based on the acquired pressure being greater than the threshold value, determine that the touch input is not the erroneous touch.

The processor may be further configured to: acquire a touch location corresponding to the touch input using the touch sensor; based on the touch location being within a preset area, determine that the touch input is the erroneous touch; and based on the touch location not being within the preset area, determine that the touch input is not the erroneous touch.

The preset area may be determined based on a usage pattern of the wearable device.

The processor may be further configured to: while the touch input is acquired, acquire context information related to the wearable device; and determine, based on the sensing value and the context information, whether the touch input is the erroneous touch.

According to an aspect of the disclosure, a control method for a wearable device including a plurality of sensors including a touch sensor, includes: acquiring a touch input using the touch sensor; while the touch input is acquired, acquiring a sensing value from at least one sensor other than the touch sensor among the plurality of sensors; determining, based on the sensing value, whether the touch input is an erroneous touch; and based on a result of the determining, performing an operation corresponding to the touch input.

The plurality of sensors may include a proximity sensor, and wherein the acquiring the sensing value may include acquiring, using the proximity sensor, a distance from the wearable device to a user, and the determining whether the touch input is erroneous may include: based on the distance being within a preset distance range, determining that the touch input is not the erroneous touch; and based on the distance being outside of the preset distance range, determining that the touch input is the erroneous touch.

The plurality of sensors may include a proximity sensor, the acquiring the sensing value may include acquiring, using the proximity sensors distance information from the wearable device to a user, and the determining whether the touch input is erroneous may include determining whether the touch input is erroneous by inputting the distance information to a trained neural network model.

The plurality of sensors may include a motion sensor, the acquiring the sensing value may include acquiring, by using the motion sensor, motion information of the wearable device, and the determining whether the touch input is erroneous may include determining whether the touch input is erroneous by inputting the motion information to a trained neural network model.

The plurality of sensors may include a pressure sensor, and the acquiring the sensing value may include acquiring, by using the pressure sensor, a pressure corresponding to the touch input, the determining whether the touch input is erroneous may include: based on the acquired pressure being smaller than a threshold value, determining that the touch input is the erroneous touch; and based on that the acquired pressure being greater than the threshold value, determining that the touch input is not the erroneous touch.

The acquiring the sensing value may include acquiring a touch location corresponding to the touch input using the touch sensor, and the determining whether the touch input is erroneous may include: based on the touch location being within a preset area, determining that the touch input is the erroneous touch; and based on the touch location not being within the preset area, determining that the touch input is not the erroneous touch.

The preset area may be determined based on a usage pattern of the wearable device.

BRIEF DESCRIPTION OF THE DRAWINGS

The above and other aspects, features, and advantages of specific embodiments of the present disclosure will be more apparent from the following description with reference to the accompanying drawings, in which:

FIG. 4B is a graph illustrating motion information according to an embodiment of the disclosure;

DETAILED DESCRIPTION

Figure 1:
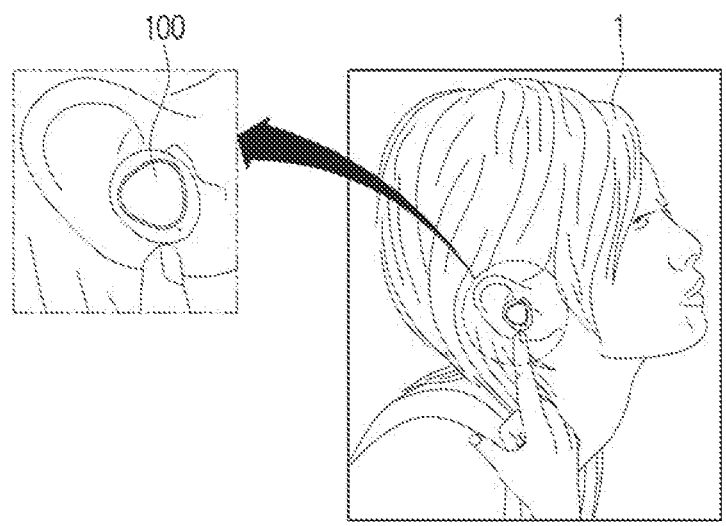
FIG. 1 is a diagram illustrating a state in which a user wears a wearable device according to an embodiment of the disclosure.

Terms used in the specification will be briefly explained, and then the disclosure will be described in detail.

Although the terms used in the embodiments of the disclosure are selected from general terms, which are currently in wide use, in consideration of their functions in the disclosure, the terms may be changed depending on an intention of a person skilled in the art, a precedent, and an emergence of a new technology. In addition, in certain circumstances, some terms may be arbitrarily chosen by the applicant. In this case, their meanings will be explained in detail in the corresponding parts of the description of the disclosure. Therefore, the terms used in the disclosure should be defined based on the meanings thereof and the overall content of the disclosure, rather than simply based on what these terms are called.

The embodiments of the disclosure may be modified in various ways and may have several embodiments. Specific embodiments are to be illustrated in the drawings and to be described in detail in the detailed description. However, it should be understood that it is not intended to limit the scope to the specific embodiments, and the embodiments of the disclosure include all modifications, equivalents and/or alternatives falling within the spirit and technical scope of the disclosure. In describing the embodiments, a detailed description of a related known technology may be omitted if it may obscure the gist of the disclosure.

The terms "first", "second", and the like may be used to describe various components, but the components should not be limited by these terms. These terms are used only for the purpose of distinguishing one component from another component.

A singular expression includes a plural expression, unless clearly indicated otherwise in the context. In the application, it should be understood that the term "include", "comprise", or the like indicates the presence of features, numbers, steps, operations, components, parts or combinations thereof described in the specification, and does not preclude the presence or possibility of addition of one or more other features, numbers, steps, operations, components, parts, or combinations thereof.

Hereinafter, with reference to the accompanying drawings, embodiments of the disclosure will be described in detail so that those having ordinary knowledge in the art to which the disclosure pertains can easily carry out the embodiments. However, the disclosure may be implemented in several different forms and is not limited to the embodiments described herein. In addition, in order to clearly explain the disclosure, parts irrelevant to the description are omitted in the drawings, and similar parts are denoted by similar reference signs throughout the specification.

FIG. 1 is a diagram illustrating a state in which a user is wearing a wearable device according to an embodiment of the disclosure.

A wearable device 100 according to an embodiment of the disclosure may be an earphone. The wearable device 100 may acquire various types of touch inputs from a user 1. For example, the wearable device 100 may acquire at least one touch input among a tap input, a double tap input, a drag input, a slide input, a swipe input, a press input, and a hold input.

Then, the wearable device 100 may perform a function corresponding to the touch input. For example, the function corresponding to the touch input may include at least one of a function of playing audio content through an application stored in a user terminal (e.g., a smart phone), a function of pausing the audio content being played, and a volume of the audio content being played. However, this is merely an embodiment, and the wearable device 100 may be implemented as any type of electronic device including a smart watch or a smart glass. It should be noted that embodiments of the disclosure is not necessarily applicable only to the wearable device 100, and may also be applied to another mobile device such as a smart phone.

The wearable device 100 may acquire an unintentional touch of the user 1, a so-called erroneous touch (or accidental touch). For example, the wearable device 100 may acquire a touch input that is input while the user 1 adjusts a position of the wearable device 100 in order to wear the wearable device 100 to fit the user's ear. Alternatively, in a situation in which the user 1 is exercising while wearing the wearable device 100, the user 1 may touch the wearable device 100 to prevent the wearable device 100 from falling off from the user's body. In such a case, when the wearable device 100 performs a function corresponding to the touch input of the user 1 (e.g., pausing music being played), this may cause inconvenience to the user 1. Therefore, the wearable device 100 needs to determine whether or not the touch input of the user 1 is an erroneous touch, and perform a function corresponding to the touch input based thereon.

Hereinafter, a method of determining whether or not a touch input of the user 1 is an erroneous touch will be described.

Figure 2A:
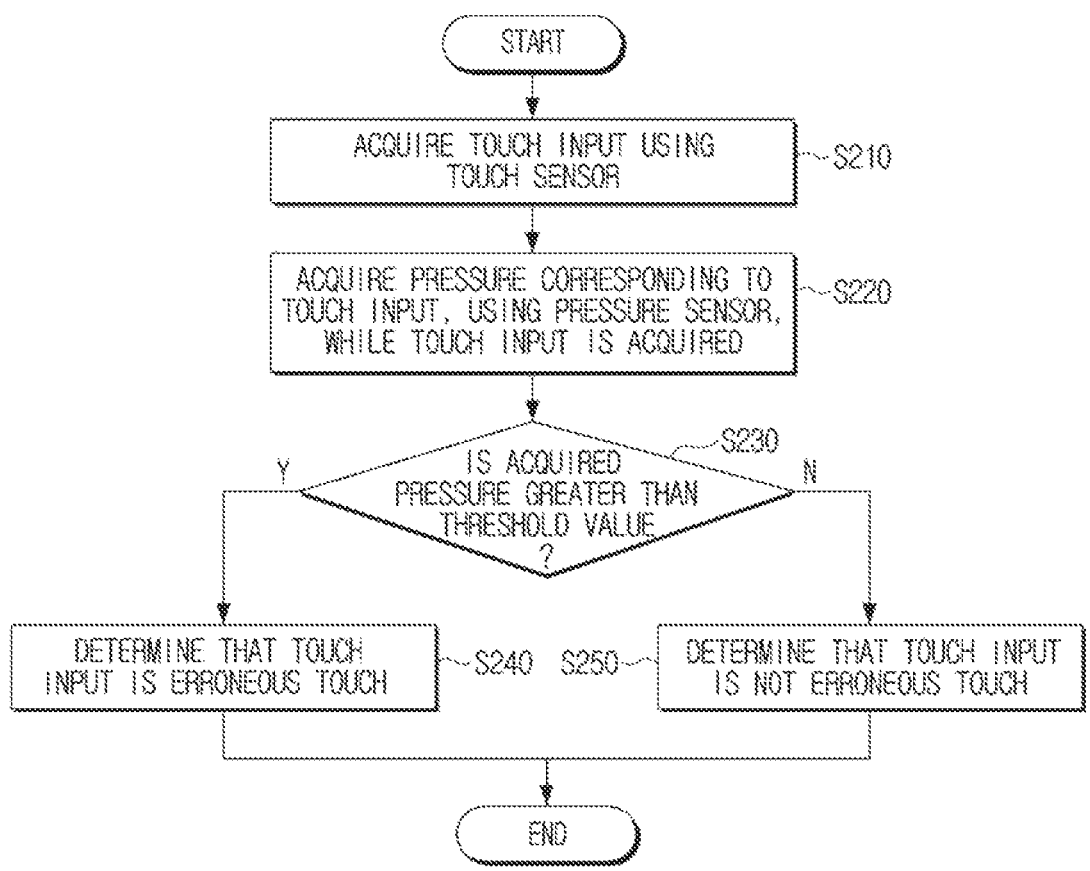
FIG. 2A is a flowchart illustrating a method of determining whether or not a touch input is an erroneous touch using a pressure sensor according to an embodiment of the disclosure.

FIG. 2A is a flowchart illustrating a method of determining whether or not a touch input is an erroneous touch using a pressure sensor according to an embodiment of the disclosure.

Figure 2B:
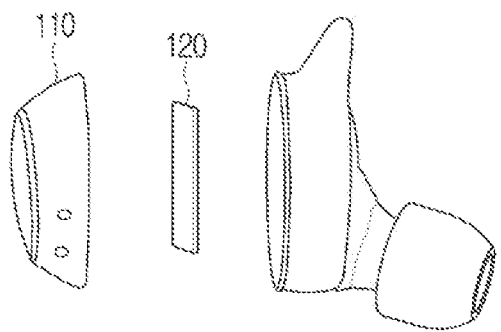
FIG. 2B is an exploded perspective view of the wearable device according to an embodiment of the disclosure.

The wearable device 100 may acquire a touch input using a touch sensor (S210). In addition, the wearable device 100 may acquire a pressure corresponding to the touch input, using a pressure sensor, while the touch input is acquired (S220). As illustrated in FIG. 2B, a pressure sensor 120 according to the disclosure may be provided in the wearable device 100 to sense a pressure corresponding to a user's touch input. Here, the pressure (or touch pressure) corresponding to the touch input may refer to a pressure under which a user's body part (e.g., a finger) presses a touch sensor 110. Alternatively, the pressure corresponding to the touch input may refer to a pressure under which the wearable device 100 presses a user's body part (e.g., an ear) according to the touch input. The pressure sensor 120 may exist separately from the touch sensor 110, or may be implemented in an integrated form together with the touch sensor 110.

When the pressure corresponding to the touch input is acquired, the wearable device 100 may identify whether or not the acquired pressure is greater than a threshold value (S230). Here, the threshold value refers to a reference pressure for determining whether or not the touch of the user 1 is an intentional touch. A touch pressure when the user 1 makes an erroneous touch input may be greater than a touch pressure when the user 1 makes an intentional touch input. For example, a first pressure when the user 1 touches the wearable device 100 to prevent the wearable device 100 from falling off from the user's body, that is, when an erroneous touch input is made, may be greater than a second pressure when the user 1 makes an intentional touch input. Accordingly, the wearable device 100 may determine whether or not the touch input is an erroneous touch by identifying whether or not the acquired pressure is greater than the threshold value.

Specifically, when it is identified that the acquired pressure is greater than the threshold value, the wearable device 100 may determine that the touch input is an erroneous touch (S240). At this time, the wearable device 100 may not perform a function corresponding to the touch input. On the other hand, when it is identified that the acquired pressure is smaller than the threshold value, the wearable device 100 may determine that the touch input is not an erroneous touch (S250). At this time, the wearable device 100 may perform a function corresponding to the touch input.

The wearable device 100 may determine whether or not the touch input is an erroneous touch on the basis of touch pressure information stored in a database. For example, as shown in Table 1 below, a look-up table in which touch types are matched with corresponding touch pressures, respectively, may be stored in the database. The database may be stored in a memory 160 or an external server.

TABLE 1

| touch pressure (psi) | touch type |
| --- | --- |
| 0.5 to 25 | intentional touch |
| greater than 25 | accidental touch |

Figure 2C:
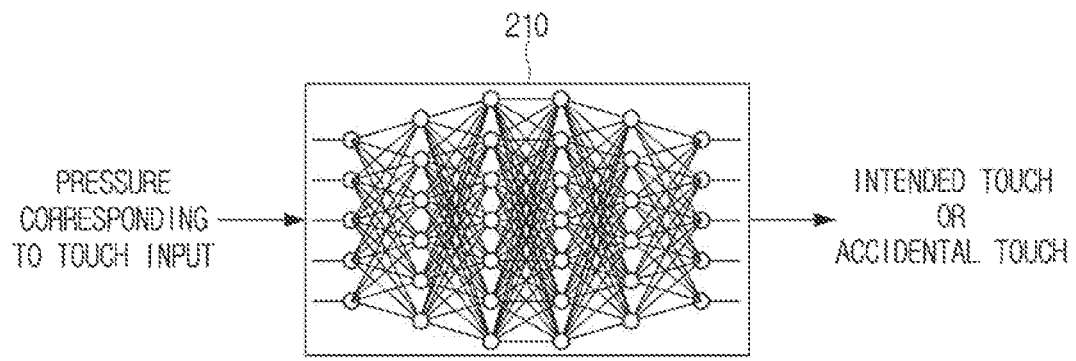
FIG. 2C is a diagram illustrating a method of determining whether or not a touch input is an erroneous touch using a pressure sensor according to another embodiment of the disclosure.

The wearable device 100 may determine whether or not the acquired touch input is an erroneous touch by comparing the acquired touch input with the touch pressure information as shown in Table 1. For example, when the acquired touch input is 26 (psi), the wearable device 100 may identify the acquired touch input as an erroneous touch (accidental touch) (S240). On the other hand, when the acquired touch pressure is 10 (psi), the wearable device 100 may identify the acquired touch input as an intentional touch (S250). The wearable device 100 may determine whether or not the touch input is an erroneous touch using a trained neural network model. As illustrated in FIG. 2C, the wearable device 100 may identify whether or not the touch input is a user's intentional touch or an erroneous touch (accidental touch) by inputting the pressure corresponding to the touch input to a neural network model 210. Specifically, by inputting the pressure corresponding to the touch input to the neural network model 210, the wearable device 100 may determine a probability that the touch input is a user's intentional touch and a probability that the touch input is an erroneous touch (accidental touch). At this time, when the probability that the touch input is an erroneous touch is greater than a preset probability (e.g., 70%), the wearable device 100 may identify the touch input as an erroneous touch. The neural network model 210 may be trained to identify whether or not a touch input is an erroneous touch based on a pressure corresponding to the touch input. At this time, training data of the neural network model 210 may include a first touch input for operating the wearable device 100 and a pressure corresponding to the first touch input, and a second touch input for adjusting a position of the wearable device 100 and a pressure corresponding to the second touch input. The neural network model 210 may be trained in advance based on the training data according to a supervised learning method and stored in the wearable device 100. For example, the neural network model 210 may be implemented as a convolutional neural network (CNN) model.

The wearable device 100 may collect and store, as training data, a touch input acquired while a user 1 uses the wearable device 100 and whether or not a function corresponding to the acquired touch input is performed. Then, the wearable device 100 may update the neural network model 210 based on the stored training data. Specifically, the wearable device 100 may update parameters of the neural network model 210. Accordingly, the performance of the neural network model 210 can be further improved.

Figure 3A:
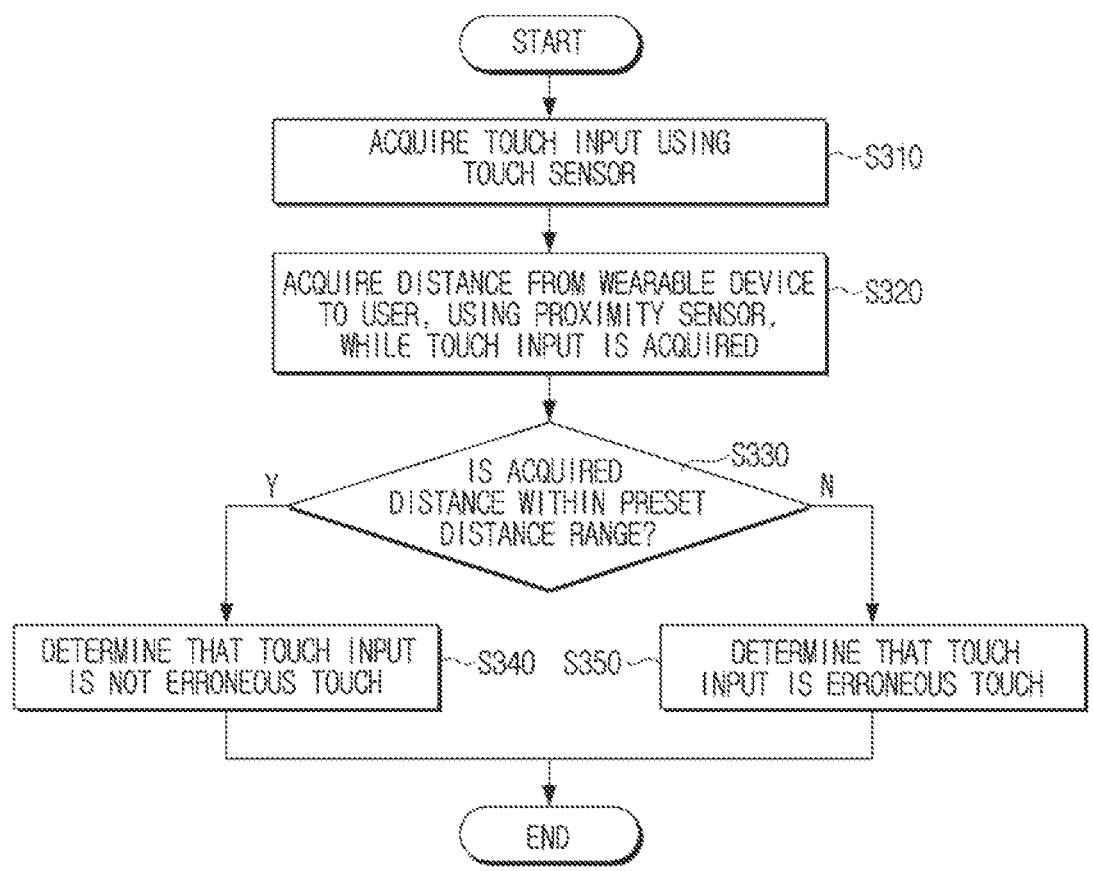
FIG. 3A is a flowchart illustrating a method of determining whether or not a touch input is an erroneous touch using a proximity sensor according to an embodiment of the disclosure.
Figure 3B:
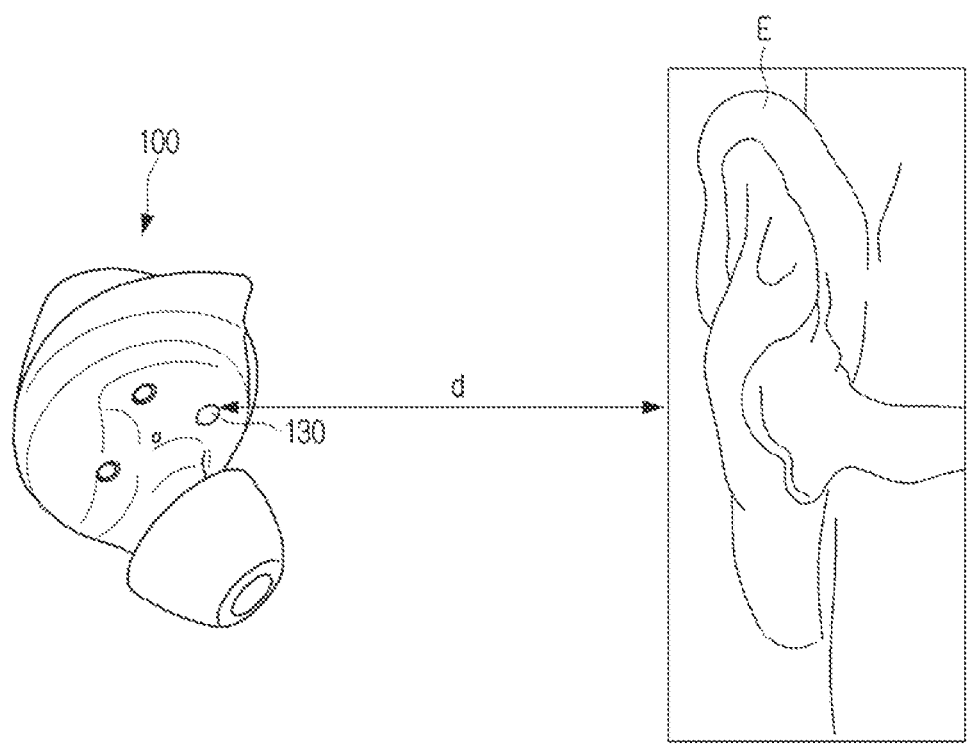
FIG. 3B is a perspective view illustrating the wearable device according to an embodiment of the disclosure.
Figure 3C:
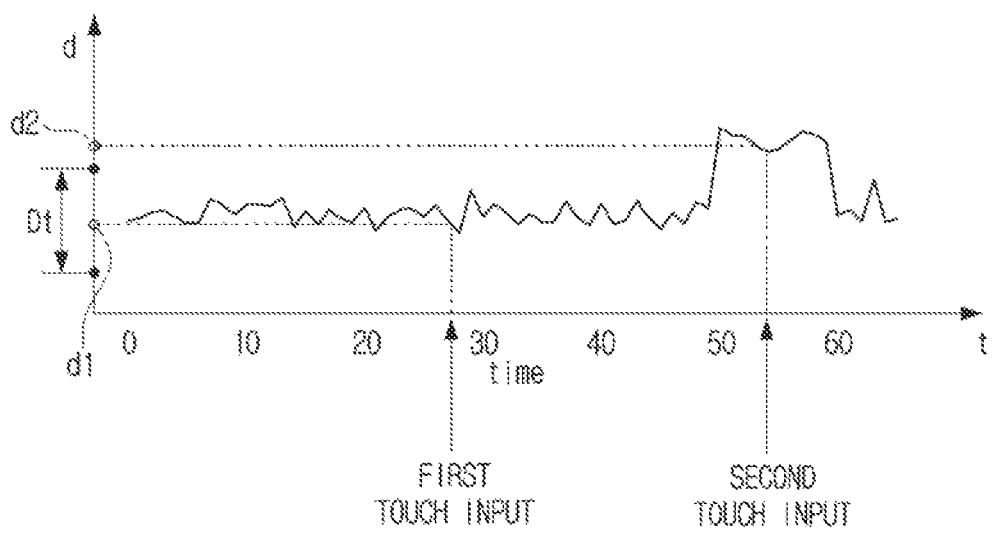
FIG. 3C is a graph illustrating a sensing value of the proximity sensor according to an embodiment of the disclosure.

FIG. 3A is a flowchart illustrating a method of determining whether or not a touch input is an erroneous touch using a proximity sensor according to an embodiment of the disclosure. FIG. 3B is a perspective view illustrating a wearable device according to an embodiment of the disclosure. FIG. 3C is a graph illustrating a sensing value of the proximity sensor according to an embodiment of the disclosure.

The wearable device 100 may acquire a touch input using a touch sensor (S310). In addition, the wearable device 100 may acquire a distance from the wearable device 100 to a user, using a proximity sensor, while the touch input is acquired (S320). Here, the distance from the wearable device 100 to the user (or the distance with respect to the user) refers to a distance from the wearable device 100 (or the proximity sensor) to a user's body part. For example, referring to FIG. 3B, a distance d from the wearable device 100 to the user 1 may refer to a distance from a proximity sensor 130 to a user's ear E.

The wearable device 100 may determine whether or not the touch input is an erroneous touch based on whether or not the distance acquired while the touch input is acquired is within a preset distance range (S330). Here, a preset distance range Dt refers to a distance for determining whether or not a user's touch input is an intentional touch. For example, a distance acquired when the wearable device 100 is about to fall off from the body of the user 1 may be out of the preset distance range Dt. At this time, the user 1 may touch (i.e., erroneously touch) the wearable device 100 in order to prevent the wearable device 100 from falling off from his/her body. Accordingly, when the acquired distance is not within the preset distance range, the wearable device 100 may determine that the touch input is an erroneous touch (S350). On the other hand, when the acquired distance is within the preset distance range Dt, the wearable device 100 may determine that the touch input is not an erroneous touch (S340).

For a more specific example, if a distance measured from the body of the user 1 to the wearable device 100 is within the preset distance range Dt (e.g., 0 to 2 mm) when the touch input is acquired, the wearable device 100 may determine that the touch input is not an erroneous touch. On the other hand, if a distance measured from the body of the user 1 to the wearable device 100 is not within the preset distance range Dt (e.g., 0 to 2 mm) when the touch input is acquired, the wearable device 100 may determine that the touch input is an erroneous touch.

FIG. 3C is a graph illustrating a sensing value of the proximity sensor according to an embodiment of the disclosure. When a user's touch input is acquired, the wearable device 100 may identify a distance d with respect to the user 1 when the touch input is acquired. Then, the wearable device 100 may determine whether or not the touch input is an erroneous touch, based on whether or not the identified distance is within the preset distance range Dt. For example, the wearable device 100 may identify a first distance d1 when a first touch input is acquired and a second distance d2 when a second touch input is acquired. Since the first distance d1 is within the preset distance range Dt, the wearable device 100 may determine the first touch input as an intentional touch input of the user 1. On the other hand, since the second distance d2 is out of the preset distance range Dt, the wearable device 100 may determine the second touch input as an erroneous touch.

The wearable device 100 may determine whether or not the touch input is an erroneous touch based on the distance to the user 1 stored in a database. For example, a look-up table in which touch types are matched with corresponding distances d with respect to the user, respectively, may be stored in the database. The wearable device 100 may determine whether or not the acquired touch input is an erroneous touch by comparing the acquired distance with the stored distance. For example, a distance acquired when the touch input is acquired is 4 mm, the wearable device 100 may identify the acquired touch input as an erroneous touch (accidental touch). On the other hand, a distance acquired when the touch input is acquired is 1 mm, the wearable device 100 may identify the touch input as an intentional touch.

The wearable device 100 may identify whether or not a touch input is an erroneous touch using a neural network model. For example, the wearable device 100 may identify whether or not the touch input is an erroneous touch by inputting a sensing value of the proximity sensor to the trained neural network model. In this case, the neural network model may be trained to identify whether or not a touch input is an erroneous touch based on a sensing value of the proximity sensor at a time point when the touch input is acquired. Training data of the neural network model may include a first touch input for operating the wearable device 100 and a first sensing value of the proximity sensor corresponding to the first touch input, and a second touch input for adjusting a position of the wearable device and a sensing value of the proximity sensor corresponding to the second touch input. The neural network model may be trained in advance based on the training data according to a supervised learning method and stored in the wearable device 100.

Figure 4A:
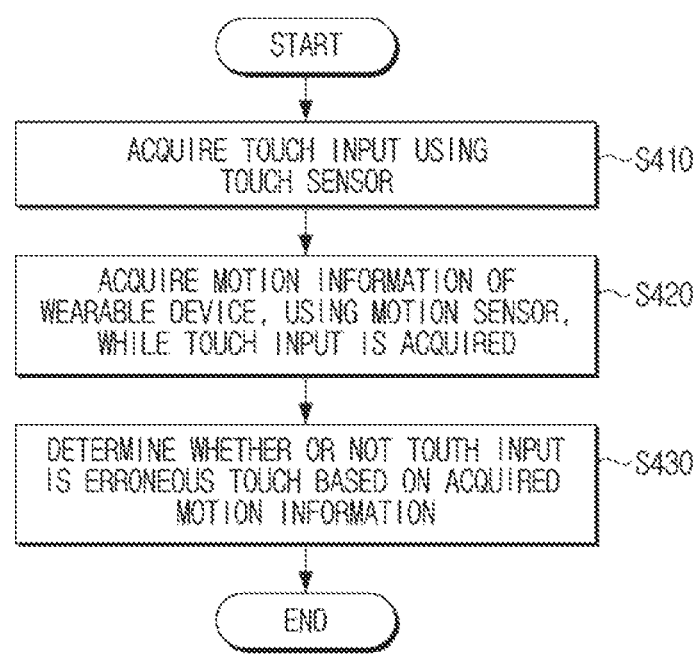
FIG. 4A is a flowchart illustrating a method of determining whether or not a touch input is an erroneous touch using a motion sensor according to an embodiment of the disclosure.

FIG. 4A is a flowchart illustrating a method of determining whether or not a touch input is an erroneous touch using a motion sensor according to an embodiment of the disclosure. FIG. 4B is a graph illustrating motion information according to an embodiment of the disclosure.

The wearable device 100 may acquire a touch input using a touch sensor (S410). In addition, the wearable device 100 may acquire motion information of the wearable device, using a motion sensor, while the touch input is acquired (S420). Here, the motion sensor may include at least one of a gyro sensor and an acceleration sensor. In this case, the motion information may include a sensing value of the motion sensor, that is, at least one of acceleration information and angular velocity information for each of three axes (x, y, z). Also, the motion information may refer to a value calculated based on the sensing value of the motion sensor.

For example, the motion information may refer to a magnitude of an angular velocity vector that is a sensing value of the gyro sensor. The sensing value of the motion sensor according to the disclosure may refer to a value (e.g., a magnitude of an angular velocity vector) calculated based on the angular velocity, as well as an angular velocity of the wearable device 100.

The wearable device 100 may determine whether or not the touch input is an erroneous touch based on the acquired motion information (S430). For example, when the user 1 suddenly runs while wearing the wearable device 100, the wearable device 100 may be about to fall off from the body of the user 1. In such a situation, a sensing value of the motion sensor may be out of a preset range Gt. Also, the user 1 may touch the wearable device 100 in order to prevent the wearable device 100 from falling off from his/her body. Accordingly, the wearable device 100 may determine whether or not the touch input is an erroneous touch, based on whether or not the sensing value of the motion sensor is within the preset range Gt.

Specifically, when the sensing value of the motion sensor is within the preset range Gt, the wearable device 100 may determine that the touch input is not an erroneous touch. For example, in FIG. 4B, since a first sensing value G1 when a first touch input is acquired is within the preset range Gt, the wearable device 100 may determine that the touch input is an intentional touch input, not an erroneous touch. On the other hand, when the sensing value of the motion sensor is out of the preset range Gt, the wearable device 100 may determine that the touch input is an erroneous touch. For example, in FIG. 4B, since a second sensing value G2 when a second touch input is acquired is out of the preset range Gt, the wearable device 100 may determine the touch input as an erroneous touch.

The wearable device 100 may determine whether or not the touch input is an erroneous touch based on information stored in a database. For example, a look-up table in which touch types are matched with corresponding sensing values of the motion sensor, respectively, may be stored in the database. The wearable device 100 may determine whether or not the acquired touch input is an erroneous touch by comparing the sensing value of the motion sensor when the touch input is acquired with the stored sensing value.

The wearable device 100 may identify whether or not a touch input is an erroneous touch using a neural network model. For example, the wearable device 100 may identify whether or not the touch input is an erroneous touch by inputting a sensing value of the motion sensor to the trained neural network model. In this case, the neural network model may be trained to identify whether or not a touch input is an erroneous touch based on a sensing value of the motion sensor (or motion information) at a time point when the touch input is acquired. Training data of the neural network model may include a first touch input for operating the wearable device 100 and a first sensing value of the motion sensor corresponding to the first touch input, and a second touch input for adjusting a position of the wearable device and a sensing value of the motion sensor corresponding to the second touch input. The neural network model may be trained in advance based on the training data according to a supervised learning method and stored in the wearable device 100.

The above-described neural network model may be trained to determine whether or not a touch input is an erroneous touch based on sensing values of at least two or more of the pressure sensor, the proximity sensor, and the motion sensor. For example, the wearable device 100 may identify whether or not the touch input is an erroneous touch by inputting both a sensing value of pressure sensor and a sensing value of the proximity sensor to the neural network model.

Figure 5A:
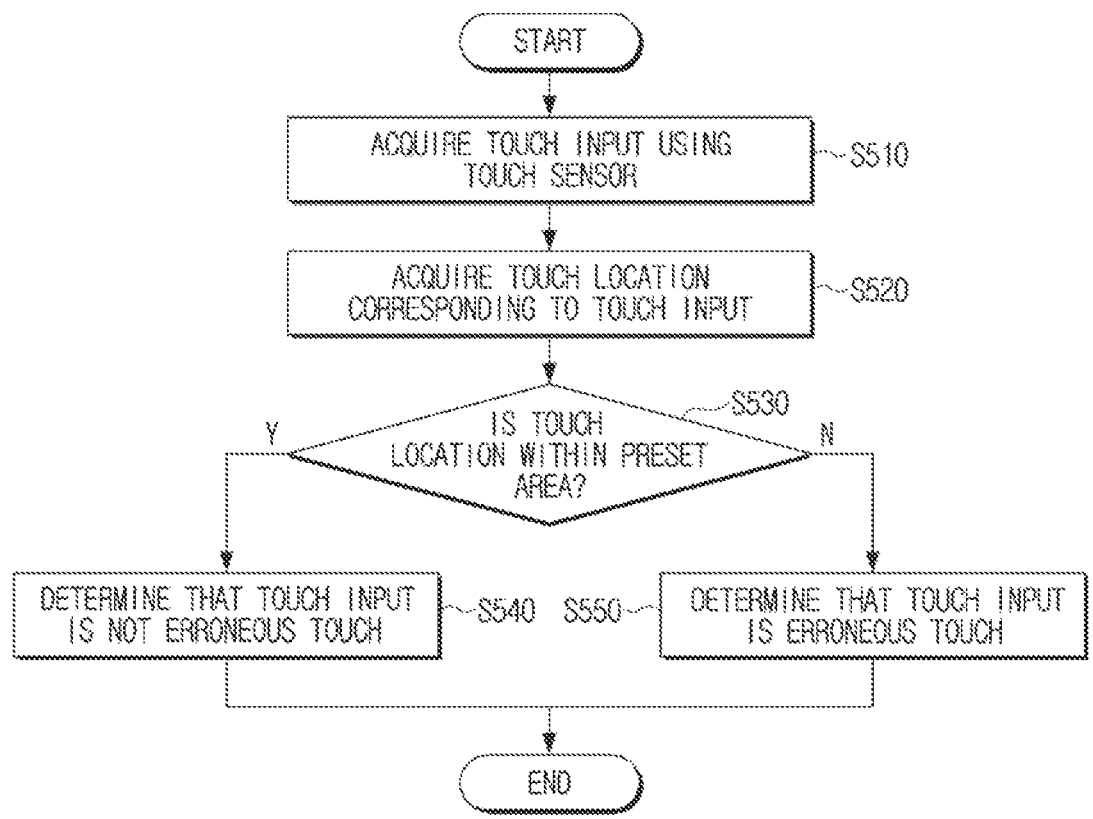
FIG. 5A is a flowchart illustrating a method of determining whether or not a touch input is an erroneous touch using a touch sensor according to an embodiment of the disclosure.

FIG. 5A is a flowchart illustrating a method of determining whether or not a touch input is an erroneous touch using a touch sensor according to an embodiment of the disclosure.

Figure 5B:
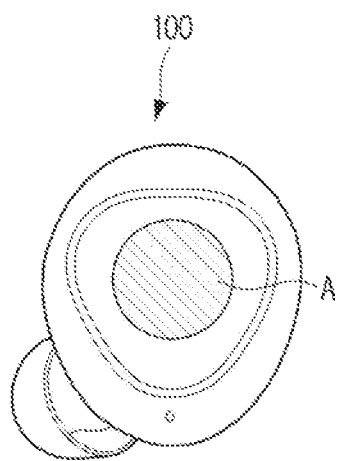
FIG. 5B is a diagram illustrating a preset area according to an embodiment of the disclosure.

The wearable device 100 may acquire a touch input using a touch sensor (S510). When the touch input is acquired, the wearable device 100 may acquire a touch location corresponding to the touch input (S520). Then, the wearable device 100 may identify whether or not the touch location is within a preset area (S530). Here, the preset area is an area for determining whether or not a user's touch is an intentional touch. For example, as illustrated in FIG. 5B, the preset area may be set in advance on one surface of a touch pad. Information on the preset area (e.g., a location or a range of the preset area) may be stored in the memory 160. The information on the preset area may be set and updated based on a usage pattern, such as a location at which the user 1 touches the touch sensor 110 or the number of times the user 1 touches the touch sensor 110 while using the wearable device 100.

When it is identified that the acquired touch location is within the preset area, the wearable device 100 may determine that the touch input is not an erroneous touch (S540). At this time, the wearable device 100 may perform a function corresponding to the touch input. On the other hand, when it is identified that the acquired touch location is not within the preset area, the wearable device 100 may determine that the touch input is an erroneous touch (S550). At this time, the wearable device 100 may ignore the touch input and may not perform a function corresponding to the touch input.

Figure 6:
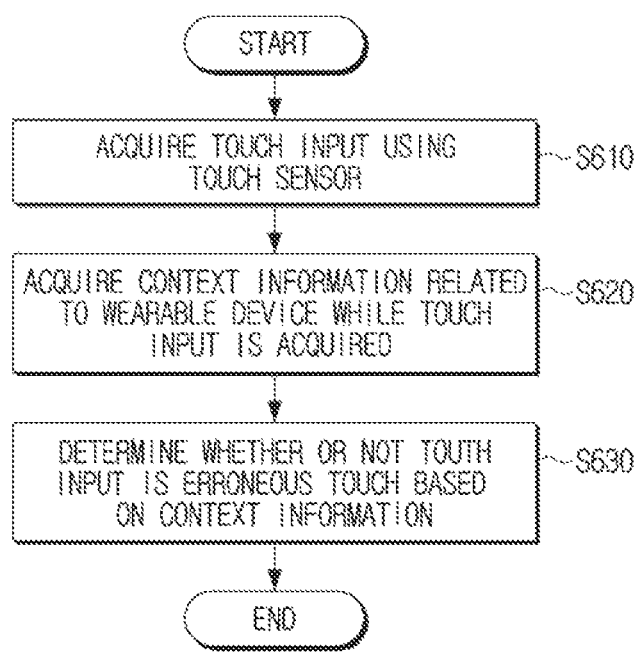
FIG. 6 is a flowchart illustrating a method of determining whether or not a touch input is an erroneous touch using context information according to an embodiment of the disclosure.

The wearable device 100 may determine whether or not a touch input is an erroneous touch based on context information. FIG. 6 is a flowchart illustrating a method of determining whether or not a touch input is an erroneous touch using context information according to an embodiment of the disclosure.

The wearable device 100 may acquire a touch input using a touch sensor (S610). The wearable device 100 may acquire context information related to the wearable device 100 while the touch input is acquired (S620), and may determine whether or not the touch input is an erroneous touch based on the acquired context information (S630). For example, the context information related to the wearable device 100 may include a volume size of audio content currently output through the wearable device 100. In a state where the volume size of the audio content exceeds a threshold value, the wearable device 100 may acquire a touch input (e.g., a double tap) corresponding to volume up. At this time, since the current volume size exceeds the threshold value, the wearable device 100 may determine the acquired touch input as an erroneous touch. Accordingly, the wearable device 100 may not perform an operation of increasing the volume size of the content. The threshold value may be set in advance by the user 1, or may be learned based on a user's usage pattern. Also, the threshold value may vary depending on genre of audio content. For example, a threshold value when the audio content is ballad music may be smaller than a threshold value when the audio content is rock music.

As another example, the context information may include information related to a user's state (or operation). Specifically, the context information may include information on whether the user 1 is exercising or walking. When a touch input is acquired in a state where the user 1 is exercising, the wearable device 100 may determine the touch input as an erroneous touch. On the other hand, when a touch input is acquired in a state where the user 1 is stopped, the wearable device 100 may determine the touch input as an erroneous touch. The information related to the user's state may be acquired through an external device (e.g., a smart phone or a smart watch) capable of communicating with the wearable device 100. However, this is merely an embodiment, and the wearable device 100 may acquire information related to a user's state based on a sensing value of the motion sensor.

The wearable device 100 may determine whether or not a touch input is an erroneous touch, with a sensing value of the above-described sensor being considered together with context information. For example, when context information indicating that the user 1 is running is acquired, the wearable device 100 may increase the preset range Gt of FIG. 4B. On the other hand, when the context information indicating that the user 1 is standing in place is acquired, the wearable device 100 may decrease the preset range Gt of FIG. 4B. That is, the user 1 may touch the wearable device 100 more strongly in a situation where the user 1 moves a lot than in a state where the user 1 is standing in place. Thus, if the preset range Gt is not increased, the wearable device 100 may misrecognize a user's intentional touch input as an erroneous touch. To prevent this problem, the wearable device 100 may adjust the preset range Gt based on the context information.

Figure 7:
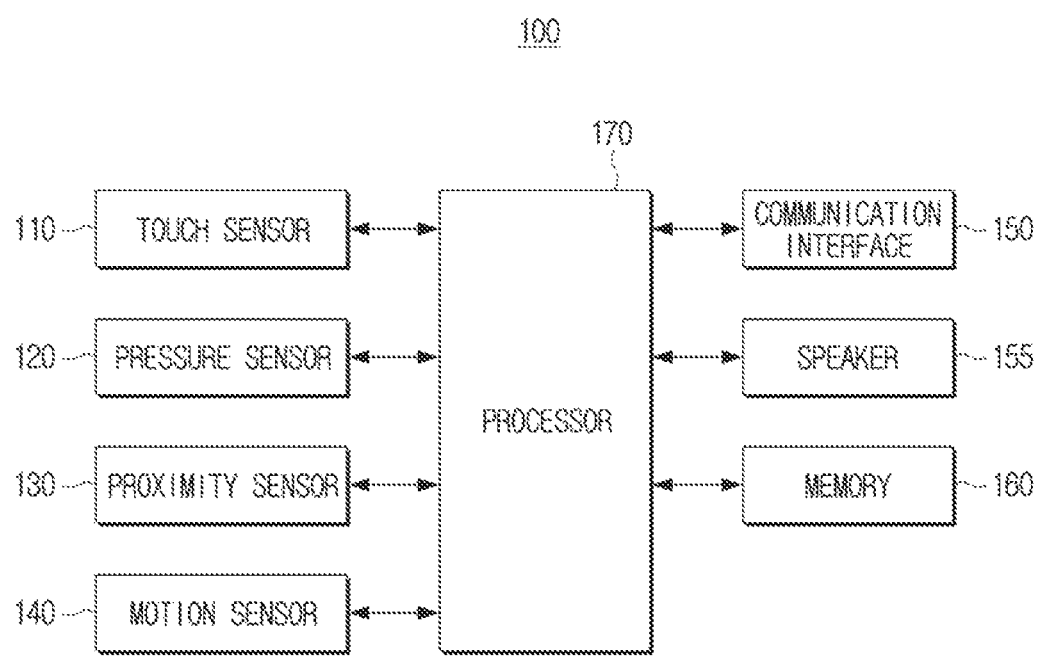
FIG. 7 is a block diagram illustrating a configuration of the wearable device 100 according to an embodiment of the disclosure.

FIG. 7 is a block diagram illustrating a configuration of the wearable device 100 according to an embodiment of the disclosure. Referring to FIG. 7, the wearable device 100 may include a touch sensor 110, a pressure sensor 120, a proximity sensor 130, a motion sensor 140, a communication interface 150, a speaker 155, a memory 160, and a processor 170.

The touch sensor 110 may acquire a user's touch input. The wearable device 100 may include multiple touch sensors 110, and the touch sensors 110 may be implemented in the form of a touch pad. The touch pad may sense an event in which a human body, such as a user's finger, touches the touch pad, based on at least one of a capacitive type and a pressure sensitive type.

The pressure sensor 120 may acquire a pressure corresponding to an input of a user 1 who touches the touch sensor 110 or the touch pad. The pressure sensor 120 may be implemented integrally with the touch pad including the touch sensor 110. Alternatively, the pressure sensor 120 may be implemented separately from the touch pad.

The proximity sensor 130 may acquire distance information between the wearable device 100 and the user. The proximity sensor 130 may be implemented as an infrared sensor. In this case, the proximity sensor 130 may output light toward the user 1 or the user's body (e.g., a user's ear) and receive reflected light. The proximity sensor 130 may acquire distance information with respect to the user 1 (or the user's body) based on a time difference or a phase difference between the output light and the reflected light.

The motion sensor 140 is a component for sensing a motion of the wearable device 100. The motion sensor 140 may include an acceleration sensor and a gyro sensor.

The communication interface 150 includes at least one circuit, and may communicate with various types of external devices according to various types of communication schemes. The communication interface 150 may include a Wi-Fi chip and a Bluetooth chip. The wearable device 100 may communicate with an external server or an external device through the communication interface 150. For example, the communication interface 150 may be connected to a user terminal (e.g., a smart phone) through Bluetooth communication to receive audio data from the user terminal. Also, the communication interface 150 may acquire context information about a user 1 from an external device through Bluetooth communication. For example, the communication interface 150 may acquire context information indicating that the user 1 is exercising from the user terminal through Bluetooth communication. Alternatively, the communication interface 150 may receive a user's bio-signal (e.g., a heart rate) from a user's smart watch through Bluetooth communication.

The speaker 155 may output an audio signal. For example, the speaker 155 may output audio data acquired from a user terminal (e.g., a smart phone) through the communication interface 150.

The memory 160 may store an operating system (OS) for controlling overall operations of the components of the wearable device 100 and commands or data related to the components of the wearable device 100. To this end, the memory 160 may be implemented as anon-volatile memory (e.g., a hard disk, a solid state drive (SSD), or a flash memory), a volatile memory, or the like. In particular, the memory 160 may store a neural network model for identifying whether or not a touch input is an erroneous touch based on a sensing value of the pressure sensor for the touch input. The neural network model may be executed by a conventional general-purpose processor (e.g., a central processing unit (CPU)) or a separate AI-dedicated processor (e.g., a graphics processing unit (GPU) or a neural processing unit (NPU)). In addition, the memory 160 may include a user database containing user's personal data.

The processor 170 may control an overall operation of the wearable device 100.

The processor 170 may acquire a touch input using the touch sensor 110. In addition, the processor 170 may acquire a sensing value from at least one sensor other than the touch sensor 110 provided in the wearable device 100 while the touch input is acquired. The processor 170 may determine whether or not the touch input is an erroneous touch based on the sensing value.

For example, the processor 170 may acquire a pressure corresponding to the touch input using the pressure sensor 120. When the acquired pressure is smaller than a threshold value, the processor 170 may determine that the touch input is an erroneous touch. On the other hand, when the acquired pressure is greater than the threshold value, the processor 170 may determine that the touch input is not an erroneous touch. In addition, the processor 170 may determine whether or not the touch input is an erroneous touch by inputting the acquired pressure to a trained neural network model.

The processor 170 may acquire a distance from the wearable device 100 to a user 1 using the proximity sensor 130. When the acquired distance is within a preset distance range, the processor 170 may determine that the touch input is not an erroneous touch. On the other hand, when the acquired distance is out of the preset distance range, the processor 170 may determine that the touch input is an erroneous touch. In addition, the processor 170 may determine whether or not the touch input is an erroneous touch by inputting the acquired distance into a trained neural network model.

The processor 170 may acquire motion information of the wearable device 100 using the motion sensor 140. For example, the processor 170 may acquire angular velocity information of the wearable device 100 using a gyro sensor. When a magnitude of a vector value corresponding to the angular velocity information is greater than a preset value, the processor 170 may determine that the touch input is an erroneous touch. On the other hand, when the magnitude of the vector value corresponding to the angular velocity information is smaller than the preset value, the processor 170 may determine that the touch input is not an erroneous touch. In addition, the processor 170 may determine whether or not the touch input is an erroneous touch by inputting the acquired motion information into a trained neural network model.

The processor 170 may acquire a touch location corresponding to the touch input using the touch sensor 110. When the touch location is within a preset area, the processor 170 may determine that the touch input is an erroneous touch. On the other hand, when the touch location is not within the preset area, the processor 170 may determine that the touch input is not an erroneous touch. The preset area may be set in advance by the user, or may be learned according to a user's usage pattern. To this end, the processor 170 may store the user's usage pattern (touch location) in the memory 160.

When the touch input is acquired, the processor 170 may acquire context information related to the wearable device. In addition, the processor 170 may determine whether or not the touch input is an erroneous touch based on the sensing value and the context information. For example, when context information indicating that the user 1 is running is acquired, the processor 170 may increase the preset range Gt of FIG. 4B. On the other hand, when the context information indicating that the user 1 is standing in place is acquired, the processor 170 may decrease the preset range Gt of FIG. 4B.

The processor 170 may perform an operation corresponding to the touch input based on a determination result. When it is determined that the touch input is an erroneous touch, the processor 170 may not perform a function corresponding to the touch input. On the other hand, when it is determined that the touch input is not an erroneous touch, the processor 170 may perform a function corresponding to the touch input. For example, the processor 170 may adjust a volume of audio content being played through an application stored in an external device (e.g., a smart phone).

In particular, functions related to artificial intelligence (AI) according to the disclosure are operated through the processor 170 and the memory 160. The processor 170 may include at least one processor. In this case, the at least one processor may be a general-purpose processor such as a CPU, an accelerated processor (AP), or a digital signal processor (DSP), a graphics-dedicated processor such as a GPU or a vision processing unit (VPU), or an AI-dedicated processor such as an NPU. The at least one processor performs control to process input data according to a predefined operation rule or an artificial intelligence model stored in the memory 160. In a case where the at least one processor is an AI-dedicated processor, the AI-dedicated processor may be designed to have a hardware structure specialized for processing a specific AI model.

The predefined operation rule or the artificial intelligence model is made through training. Here, the expression "made through training" means that a basic artificial intelligence model is trained according to a learning algorithm using a large number of pieces of training data, so that a predefined operation rule or an artificial intelligence model set to perform a desired feature (or purpose) is made. Such training may be performed in the device itself in which artificial intelligence is performed according to the disclosure, or may be achieved through a separate server and/or system. Examples of learning algorithms include, but are not limited to, supervised learning, unsupervised learning, semi-supervised learning, and reinforcement learning.

The artificial intelligence model is made through training. Here, the expression "made through training" means that a basic artificial intelligence model is trained according to a learning algorithm using a large number of pieces of training data, so that a predefined operation rule or an artificial intelligence model set to perform a desired feature (or purpose) is made. The artificial intelligence model may include multiple neural network layers. Each of the neural network layers has weight values, and performs a neural network operation through an operation between an operation result of a previous layer and the weight values. The weight values of the neural network layers may be optimized by a result of training the artificial intelligence model. For example, the weight values may be updated to reduce or minimize a loss value or a cost value obtained by the artificial intelligence model during a training process.

An artificial neural network may include a deep neural network (DNN). Examples of artificial neural networks include, but are not limited to, a convolutional neural network (CNN), a deep neural network (DNN), a recurrent neural network (RNN), a generative adversarial network (GAN), a restricted Boltzmann machine (RBM), a deep belief network (DBN), a bidirectional recurrent deep neural network (BRDNN), and a deep Q-network.

Figure 8:
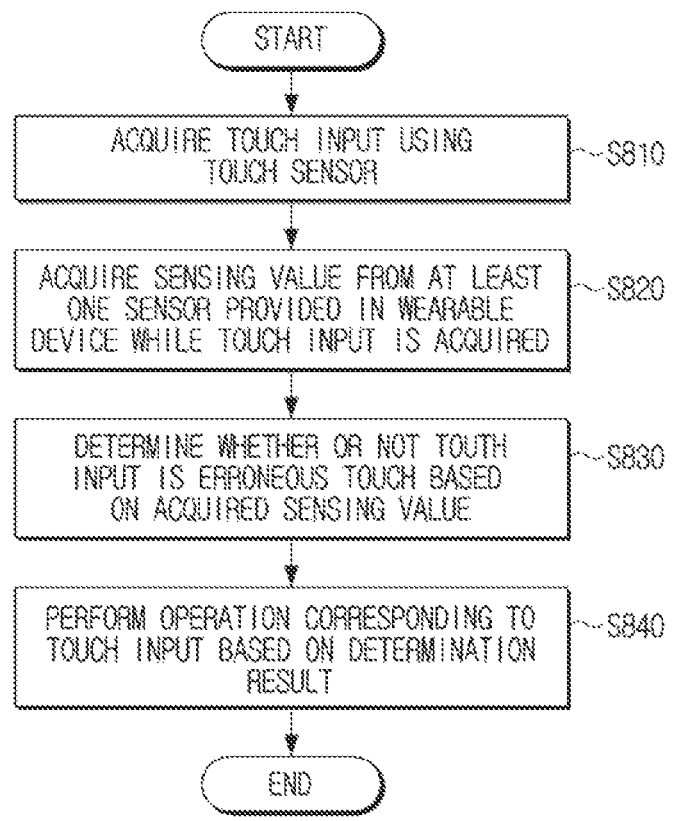
FIG. 8 is a diagram for explaining a control method for a wearable device according to an embodiment of the disclosure.

FIG. 8 is a diagram for explaining a control method for a wearable device according to an embodiment of the disclosure.

The wearable device 100 may acquire a touch input using the touch sensor 110 (S810), and acquire a sensing value from at least one sensor provided in the wearable device 100 while the touch input is acquired (S820). The wearable device 100 may acquire a sensing value of at least one of the pressure sensor 120, the proximity sensor 130, and the motion sensor 140. Then, the wearable device 100 may determine whether or not the touch input is an erroneous touch based on the acquired sensing value (S830). These steps have been described above with reference to FIG. 2A, FIG. 3A, FIG. 4A, FIG. 5A, and FIG. 6, and thus, the description thereof will not be repeated.

The wearable device 100 may perform an operation corresponding to the touch input based on a determination result (S840). When it is determined that the touch input is an erroneous touch, the wearable device 100 may not perform a function corresponding to the touch input. On the other hand, when it is determined that the touch input is not an erroneous touch, the wearable device 100 may perform a function corresponding to the touch input.

The various embodiments described above may be implemented in a recording medium readable by a computer or a device similar thereto using software, hardware, or a combination thereof. In some cases, the embodiments described in the specification may be implemented in a processor itself. According to the software implementation, the embodiments such as procedures and functions described in the specification may be implemented as separate software modules. Each of the software modules may perform one or more functions and operations described in the specification.

Computer instructions for performing processing operations according to the various embodiments of the disclosure described above may be stored in a non-transitory computer-readable medium. The computer instructions stored in the non-transitory computer-readable medium may cause a specific device to perform the processing operations according to the various embodiments described above when executed by the processor.

The non-transitory computer-readable medium refers to a medium that stores data semi-permanently, rather than a medium that stores data for a short moment, such as a register, a cache, or a memory, and can be read by a device. Specific examples of non-transitory computer-readable mediums may include a CD, a DVD, a hard disc, a Blu-ray disc, a USB, a memory card, a ROM, and the like.

A machine-readable storage medium may be provided in the form of a non-transitory storage medium. Here, the "non-transitory storage medium" is a tangible device and does not include a signal (e.g., an electromagnetic wave). This term does not differentiate a case where data is semi-permanently stored in the storage medium from a case where data is temporarily stored in the storage medium. As an example, the "non-transitory storage medium" may include a buffer in which data is temporarily stored.

According to an embodiment, the methods according to the various embodiments disclosed herein may be included in a computer program product for provision. The computer program product may be traded as a product between a seller and a buyer. The computer program product may be distributed in the form of a machine-readable storage medium (e.g., a compact disc read only memory (CD-ROM)), or may be distributed (e.g., downloaded or uploaded) online in a direct manner via an application store (e.g., PlayStore™) or between two user devices (e.g., smart phones). If the computer program product is distributed online, at least a part of the computer program product (e.g., an downloadable application) may be at least temporarily stored or temporarily generated in the machine-readable storage medium, such as a memory of a server of a manufacturer, a memory of a server of an application store, or a memory of a relay server.

According to the various embodiments of the disclosure as described above, the wearable device is capable of determining whether or not a user's touch input is an erroneous touch, and may perform a function based on a determination result. Accordingly, user's convenience and satisfaction can be improved.

According to one or more embodiments of the disclosure as described above, a wearable device may be capable of determining whether or not a user's touch input is an erroneous touch, and may perform a function based on a determination result. Accordingly, user's convenience and satisfaction may be improved.

Although embodiments of the disclosure have been illustrated and described above, the disclosure is not limited to the specific embodiments as described above, and may be modified in various ways by one having ordinary knowledge in the art to which the disclosure pertains without departing from the gist of the disclosure as claimed in the appended claims. Such modifications should not be individually understood from the technical spirit or prospect of the disclosure.

What is claimed is:

1. A wearable device comprising:
a plurality of sensors including a touch sensor; and
a processor configured to:
acquire a touch input using the touch sensor, the touch input indicating that a touch of a user wearing the wearable device is input to the wearable device;
while the touch input is acquired, acquire a sensing value from at least one sensor different from the touch sensor among the plurality of sensors;
determine, based on the sensing value acquired from the at least one sensor, whether the touch input is an erroneous touch; and
based on a result of the determination, perform an operation corresponding to the touch input,
wherein the wearable device is an earphone,
wherein the at least one sensor comprise a proximity sensor, and
wherein the processor is further configured to:
acquire, through the proximity sensor, information regarding a distance from the wearable device to an ear of the user wearing the wearable device,
based on the distance being within a preset distance range, determine that the touch input is not the erroneous touch, and
based on the distance being outside of the preset distance range, determine that the touch input is the erroneous touch.

2. The wearable device as claimed in claim 1, wherein the processor is further configured to
determine whether or not the touch input is the erroneous touch by inputting the information to a trained neural network model.

3. The wearable device as claimed in claim 1, wherein the plurality of sensors comprise a motion sensor, and
wherein the processor is further configured to:
acquire, by using the motion sensor, motion information of the wearable device; and
determine whether or not the touch input is the erroneous touch by inputting the motion information to a trained neural network model.

4. The wearable device as claimed in claim 1, wherein the plurality of sensors comprise a pressure sensor, and
the processor is further configured to:
acquire a pressure corresponding to the touch input using the pressure sensor;
based on the acquired pressure being smaller than a threshold value, determine that the touch input is the erroneous touch; and
based on the acquired pressure being greater than the threshold value, determine that the touch input is not the erroneous touch.

5. The wearable device as claimed in claim 1, wherein the processor is further configured to:
acquire a touch location corresponding to the touch input using the touch sensor;
based on the touch location being within a preset area, determine that the touch input is the erroneous touch; and
based on the touch location not being within the preset area, determine that the touch input is not the erroneous touch.

6. The wearable device as claimed in claim 5, wherein the preset area is determined based on a usage pattern of the wearable device.

7. The wearable device as claimed in claim 5, wherein the processor is further configured to:
while the touch input is acquired, acquire context information related to the wearable device; and
determine, based on the sensing value and the context information, whether the touch input is the erroneous touch.

8. A control method for a wearable device comprising a plurality of sensors comprising a touch sensor, the control method comprising:
acquiring a touch input using the touch sensor, the touch input indicating that a touch of a user wearing the wearable device is input to the wearable device;

while the touch input is acquired, acquiring a sensing value from at least one sensor different from the touch sensor among the plurality of sensors;

determining, based on the sensing value acquired from the at least one sensor, whether the touch input is an erroneous touch; and based on a result of the determining, performing an operation corresponding to the touch input, wherein the wearable device is an earphone, wherein the at least one sensor comprise a proximity sensor, and wherein the control method further comprises:
 acquiring, through the proximity sensor, information regarding a distance from the wearable device to an ear of the user wearing the wearable device,
 based on the distance being within a preset distance range, determining that the touch input is not the erroneous touch, and
 based on the distance being outside of the preset distance range, determining that the touch input is the erroneous touch.

9. The control method as claimed in claim 8,
wherein the determining whether the touch input is erroneous comprises determining whether the touch input is erroneous by inputting the distance information to a trained neural network model.

10. The control method as claimed in claim 8, wherein the plurality of sensors include a motion sensor,
wherein the acquiring the sensing value comprises acquiring, by using the motion sensor, motion information of the wearable device, and
wherein the determining whether the touch input is erroneous comprises determining whether the touch input is erroneous by inputting the motion information to a trained neural network model.

11. The control method as claimed in claim 8, wherein the plurality of sensors comprise a pressure sensor,
wherein the acquiring the sensing value comprises acquiring, by using the pressure sensor, a pressure corresponding to the touch input, and
wherein the determining whether the touch input is erroneous comprises:
 based on the acquired pressure being smaller than a threshold value, determining that the touch input is the erroneous touch; and
 based on that the acquired pressure being greater than the threshold value, determining that the touch input is not the erroneous touch.

12. The control method as claimed in claim 8, wherein the acquiring the sensing value comprises acquiring a touch location corresponding to the touch input using the touch sensor, and
wherein the determining whether the touch input is erroneous comprises:
 based on the touch location being within a preset area, determining that the touch input is the erroneous touch; and
 based on the touch location not being within the preset area, determining that the touch input is not the erroneous touch.

13. The control method as claimed in claim 12, wherein the preset area is determined based on a usage pattern of the wearable device.

14. The control method of claim 12, wherein the control method further comprises while the touch input is acquired, acquiring context information related to the wearable device; and
the determining further comprises determining, based on the sensing value and the context information, whether the touch input is the erroneous touch.

15. A non-transitory computer readable recording medium storing a program for executing an operating method of a wearable device comprising a plurality of sensors, the operating method including:
 acquiring a touch input using a touch sensor of the plurality of sensors, the touch input indicating that a touch of a user wearing the wearable device is input to the wearable device;
 while the touch input is acquired, acquiring a sensing value from at least one sensor different from the touch sensor among the plurality of sensors;
 determining, based on the sensing value acquired from the at least one sensor, whether the touch input is an erroneous touch; and
 based on a result of the determining, performing an operation corresponding to the touch input,
 wherein the wearable device is an earphone,
 wherein the at least one sensor comprise a proximity sensor, and
 wherein the operating method further comprises:
  acquiring, through the proximity sensor, information regarding a distance from the wearable device to an ear of the user wearing the wearable device,
  based on the distance being within a preset distance range, determining that the touch input is not the erroneous touch, and
  based on the distance being outside of the preset distance range, determining that the touch input is the erroneous touch.

16. The non-transitory computer readable recording medium of claim 15,
wherein the determining whether the touch input is erroneous comprises determining whether the touch input is erroneous by inputting the distance information to a trained neural network model.

17. The non-transitory computer readable recording medium of claim 15,
wherein the acquiring the sensing value comprises acquiring, by using a motion sensor, motion information of the wearable device, and
wherein the determining whether the touch input is erroneous comprises determining whether the touch input is erroneous by inputting the motion information to a trained neural network model.

* * * * *